United States Patent [19]

Saegusa et al.

[11] Patent Number: 5,365,572
[45] Date of Patent: Nov. 15, 1994

[54] CORDLESS KEY TELEPHONE SYSTEM WITH MULTIPLE TENANT FACILITY

[75] Inventors: Noboru Saegusa; Yukihiro Shimura; Shinji Kumataka; Hirokazu Adachi; Ichiro Tamura; Kosuke Hashimoto, all of Tokyo, Japan

[73] Assignees: NEC Corporation; Nippon Telegraph and Telephone Corporation, both of Tokyo, Japan

[21] Appl. No.: 947,852

[22] Filed: Sep. 21, 1992

[30] Foreign Application Priority Data

Sep. 20, 1991 [JP] Japan ................................ 3-241666

[51] Int. Cl.$^5$ .......................................... H04M 11/02
[52] U.S. Cl. ........................................ 379/61; 379/63; 379/156; 379/164
[58] Field of Search ...................... 379/58, 61, 63, 156, 379/157, 161, 164, 165, 199, 200

[56] References Cited

U.S. PATENT DOCUMENTS

| | | | |
|---|---|---|---|
| 4,538,029 | 8/1985 | Gazzoli et al. | 379/61 |
| 4,559,417 | 12/1985 | Komuro et al. | 379/199 |
| 4,750,198 | 6/1988 | Harper | 379/63 |
| 4,768,218 | 8/1988 | Yorita | 379/61 |
| 4,794,642 | 12/1988 | Arbabzadah et al. | 379/200 |
| 4,817,190 | 3/1989 | Comroe et al. | 379/63 |

Primary Examiner—Curtis Kuntz
Assistant Examiner—Dwayne D. Bost
Attorney, Agent, or Firm—Sughrue, Mion, Zinn, Macpeak & Seas

[57] ABSTRACT

In a cordless key telephone system in which radio-frequency connections are established between exchange lines and cordless stations in response to a call request, a ringing signal is transmitted in response to an incoming call by containing in it the identification of the line at which the call is terminated. Each cordless station has an array of line keys associated respectively with the exchange lines and an array of line indicators associated respectively with the line keys, and a memory for storing tenant data indicating the lines to which the cordless station is authorized to access. The cordless station examines the tenant data in response to receipt of the ringing signal, and activates one of the line indicators if the indicated line is found in the tenant data, or examines the tenant data in response to an outgoing call originated from the cordless station operating a line key, and allows a connection to be established from that station to an exchange line when the line associated with the operated line key is found in the tenant data.

8 Claims, 5 Drawing Sheets

FIG. 2A
| | #1 | #2 | #3 | #4 | #5 | ---- | #n |
|---|---|---|---|---|---|---|---|
| Outgoing/incoming calls | 1 | 0 | 1 | 1 | 0 | ---- | 0 |
Exchange lines  5-1  5-2  5-2  5-4  5-5 ---------------- 5-n
FIG. 2B
| | #1 | #2 | #3 | #4 | #5 | ---- | #n |
|---|---|---|---|---|---|---|---|
| Outgoing calls | 1 | 0 | 1 | 1 | 0 | ---- | 0 |
| Incoming calls | 0 | 1 | 0 | 1 | 0 | ---- | 0 |
Exchange lines  5-1  5-2  5-2  5-4  5-5 ---------------- 5-n
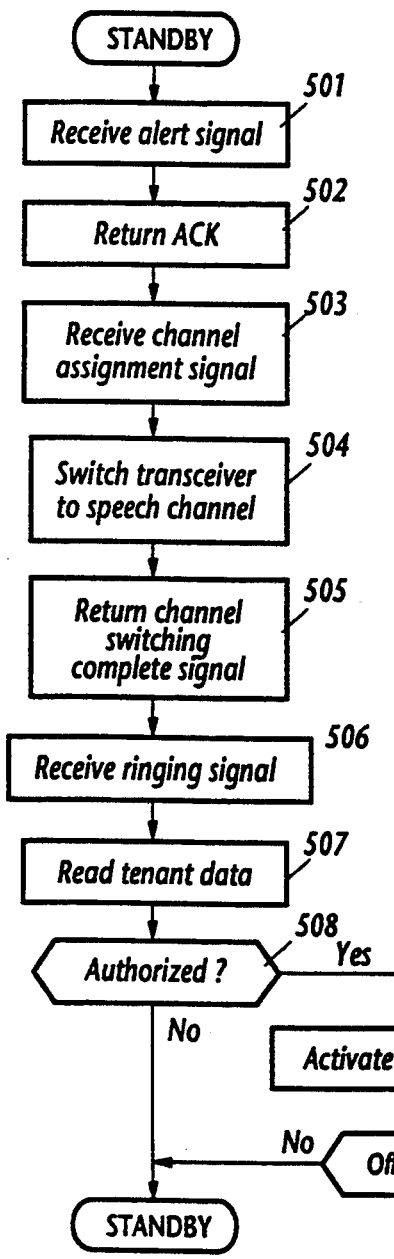
FIG. 5A
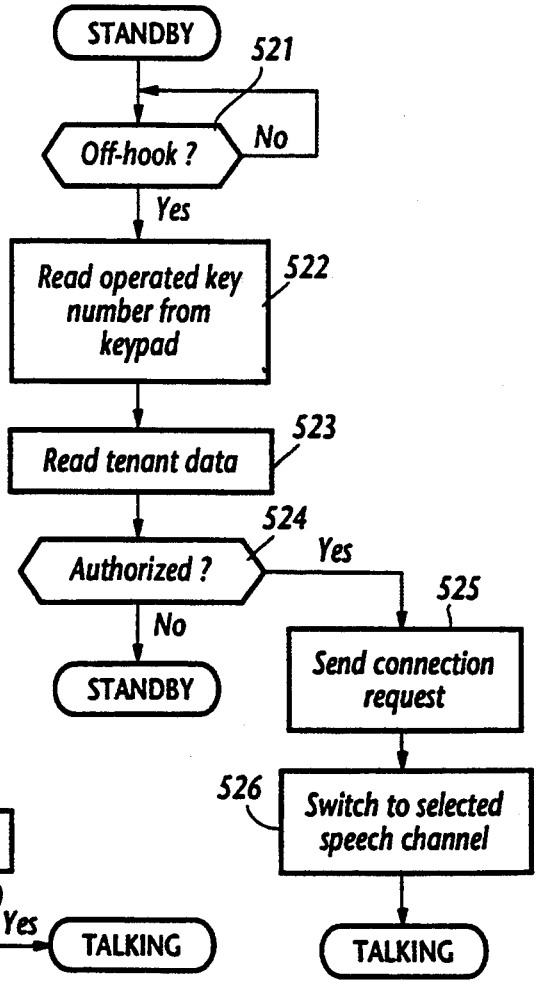
FIG. 5B

CORDLESS KEY TELEPHONE SYSTEM WITH MULTIPLE TENANT FACILITY

BACKGROUND OF THE INVENTION

The present invention relates to a cordless key telephone system. It Is known that multiple tenants are served by a single, wired key telephone system by dividing exchange lines as well as key telephone stations into groups according to the tenants and wiring so that connections are established exclusively between the exchange lines and telephone sets of the same group by a common, connection setup unit. This is achieved by storing tenant data into a memory at the central site and checking a line indication supplied from a station set with the stored tenant data to determine whether it is authorized to access the indicated exchange line.

Cordless key telephone systems have been in widespread use to take advantage of their complete elimination of the wiring network and flexible location of cordless stations. However, cordless key telephone systems with multiple tenant facility have not yet been developed, and a need has been felt for implementing such systems.

One logical extension of the wired key telephone system with multiple tenant facility to a cordless key telephone system would be to install a memory at the central site of the system. However, each cordless station would be required to transmit a line indication during a call setup to allow the central site to determine whether the calling party is authorized to access the line indicated. If exchange lines are frequently seized by unauthorized cordless stations when originating a call, channel resources of the system would be wasted because the central site cannot provide tenant check until connections are set up. In addition, the time taken for the central site to transmit a ringing signal in response to an incoming call would become prohibitively long because of the necessity to check all cordless stations against tenant data.

SUMMARY OF THE INVENTION

It is therefore an object of the present invention to provide a cordless key telephone system having a multiple tenant facility to permit different tenants to share the same system.

This object is achieved by installing a tenant facility on each of cordless stations.

According to the present invention, there is provided a cordless key telephone system in which radio-frequency connections are established by a connection setup arrangement between each of a plurality of exchange lines and a plurality of cordless stations in response to a call request. In response to an incoming call, a ringing signal is broadcast containing the identification of the line at which the incoming call is terminated. Each of the cordless stations comprises a plurality of line keys associated respectively with the exchange lines and a plurality of line indicators associated respectively with the line keys, and a memory for storing tenant data indicating ones of the exchange lines to which the cordless station is authorized to access. The cordless station is provided with a control unit that examines the tenant data in response to receipt of the ringing signal, and activates one of the line indicators when the exchange line indicated by the line identification is found in the tenant data, or examines the tenant data in response to an outgoing call originated from the cordless station that operates one of the line keys, and allows a connection to be established from that station to one of the exchange lines when the exchange line associated with the operated line key is found in the tenant data.

To facilitate registration of tenant data, it is preferable to provide a data input device that transmits a connection request to the connection setup arrangement to cause connections to be established from the data input device to the cordless stations and transmits tenant data containing the station identification of a desired cordless station and relationships between the exchange lines and the cordless station authorized to access each of the exchange lines. The control unit of each cordless station determines whether the station identification contained in the registration data matches the identification of the cordless station, and stores the tenant data into the memory when there is a match between both of the identifications.

BRIEF DESCRIPTION OF THE DRAWINGS

The present invention will be described in further detail with reference to the accompanying drawings, in which:

FIG. 2A shows a memory structure for storing tenant data regardless of incoming and outgoing calls, and FIG. 2B shows another memory structure for storing tenant data respectively according to incoming and outgoing calls;

FIG. 5A is a flowchart showing instruction steps performed by the control unit of each cordless station when an incoming call is terminated from the network, and FIG. 5B is a flowchart showing instruction steps performed by the control unit of the cordless station when an outgoing call is originated therefrom;

DETAILED DESCRIPTION

Figure 1:
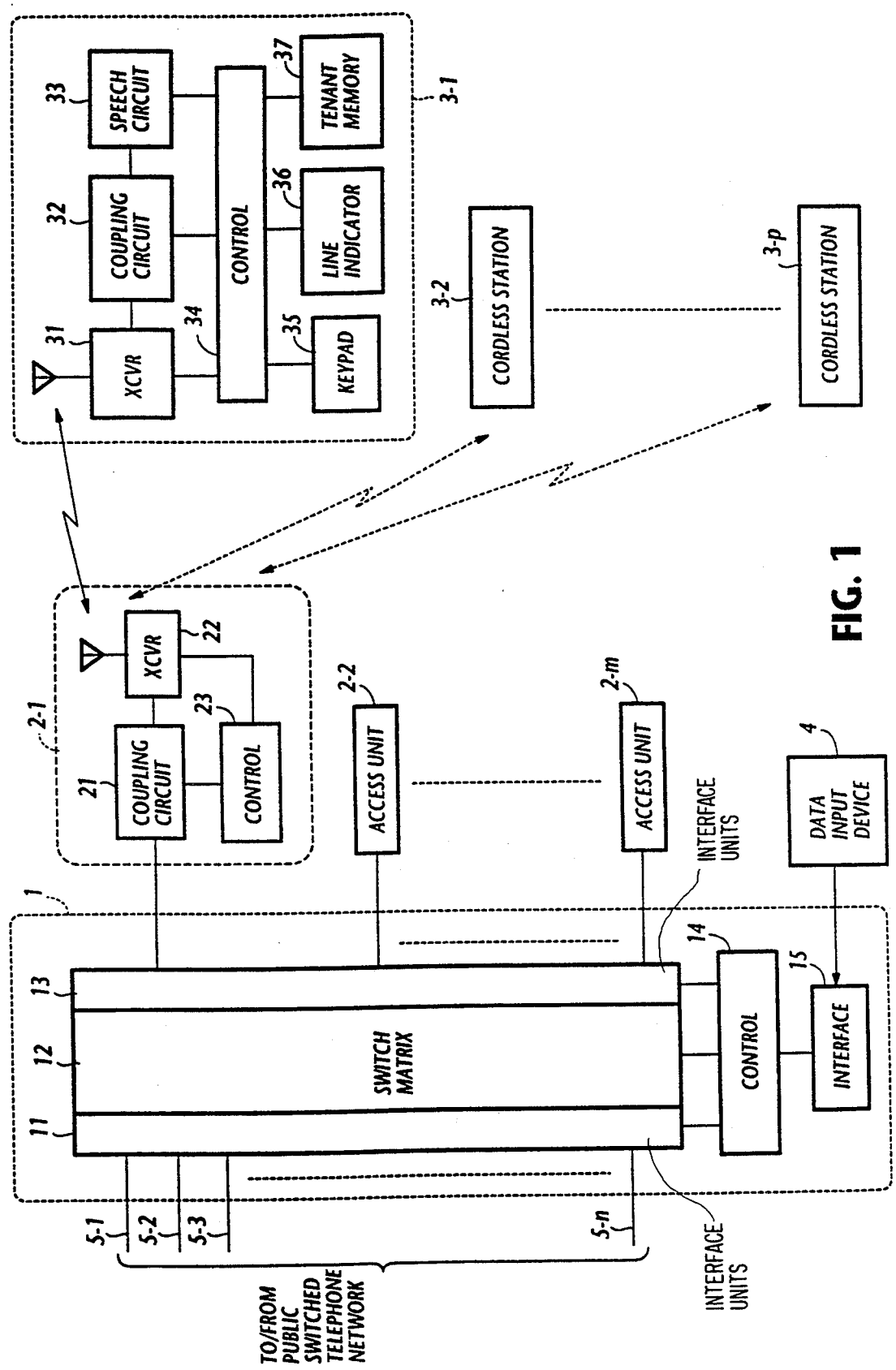
FIG. 1 is a block diagram of a cordless key telephone system according to the present invention.

Referring to FIG. 1, there is shown a cordless key telephone system, according to the present invention. The system generally comprises a main unit 1, access units 2-1 through 2-m, cordless stations 3-1 through 3-p for different tenants, and a data input device 4.

The main unit includes interface units 11 to which exchange lines 5-1 through 5-n of different tenants are terminated from a public switched telephone network, a switch matrix 12 coupled on one side to the interface units 11 and the other side coupled to interface units 13 to which all access units 2 are connected. A control unit 14 is connected to both interface units to monitor every access unit to select one to switch it to an active state to allow it to constantly monitor a call request from a cordless station sent on a control channel and to select one to switch it to an active state in response to an incoming call from the network to broadcast an alert signal on the control channel. Following these processes, control unit 14 establishes a connection in the switch matrix 12.

The data input device 4 is coupled through an interface 15 to control unit 14 to perform registration of tenant data into cordless stations in a manner as will be described.

Each access unit 2 comprises a coupling circuit 21 for establishing a path between the associated interface unit and its transceiver 22 in response to a signal from its controller 23 when the access unit is activated under the control of main unit 1.

Each cordless station 3 comprises a transceiver 31, a coupling circuit 32, and a speech circuit 33, all of which are controlled by a control unit 34, to which a keypad 35, a line indicator 36 and a tenant memory 37 are also connected. Keypad 35 and line indicators 36 are of a well known configuration consisting of an array of line keys associated respectively with the exchange lines and an array of line indicators associated respectively with the line keys to indicate operation of the associated key or arrival of a call to the associated exchange line.

During a standby, or on-hook mode, the control unit 34 of each cordless station operates the transceiver 31 in a battery saving mode in which it cyclically switches to a relatively short active period to monitor the control channel and then switches to a relatively long idle period to cut off its power supply, and this process is repeated at periodic intervals. However, on receiving a signal from an access unit or detecting an off-hook state of the cordless station, control unit 34 disables the battery saving operation and enters a continued active state and causes the coupling circuit 32 to establish a path between the transceiver 31 and speech circuit 33.

Exchange lines 5-1 through 5-n are divided according to different tenants regardless of incoming and outgoing calls. In such instances, the tenant memory 37 of each cordless station is organized, as shown in FIG. 2A, to have bit positions #1 through #n which correspond respectively to exchange lines 5-1 through 5-n to store a bit 1 or a bit 0 representing respectively the authorization or unauthorization of the cordless station to have access to each of the exchange lines for both incoming and outgoing calls.

In a modified embodiment, exchange lines are further divided between incoming and outgoing calls to grant users different authorizations depending on whether the call is incoming or outgoing. The tenant memory 37, in this case, is organized as shown in FIG. 2B to include a first memory portion 37A for storing authorization data for outgoing calls and a second memory portion 37B for storing authorization data for incoming calls. Bits 1 and 0 in memory portion 37A indicate respectively the authorization or unauthorization of each cordless station to have access to particular exchange lines on which the station is allowed to originate a call, and bits 1 and 0 in memory portion 37B indicate respectively the authorization or unauthorization of the station to have access to particular exchange lines through which it is allowed to receive an incoming call.

Figure 3:
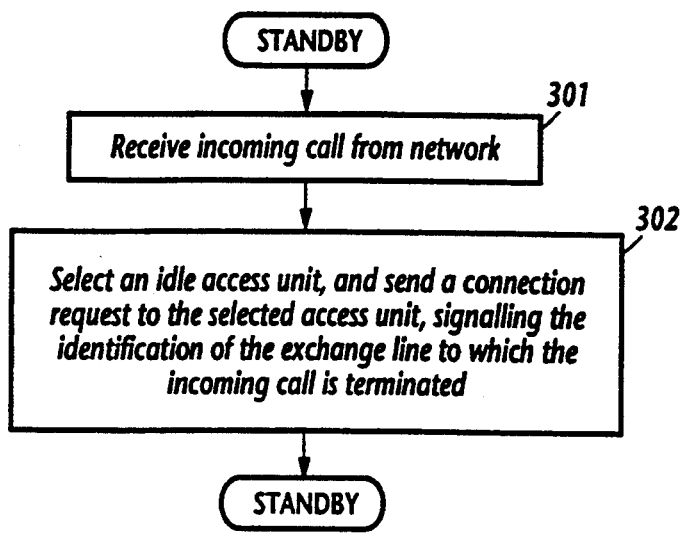
FIG. 3 is a flowchart showing instruction steps performed by the control unit of the main unit when an incoming call is terminated from the network.

In addition to the various programmed instructions, the control unit 14 of the main unit is programmed to perform instruction steps as shown in FIG. 3 when it processes an incoming call. When an incoming call is terminated from the network (step 301), control unit 14 selects one of the access units which am idle and sends a connection request to it, signalling the identification of the exchange line through which the call is received (step 302).

Figure 4:
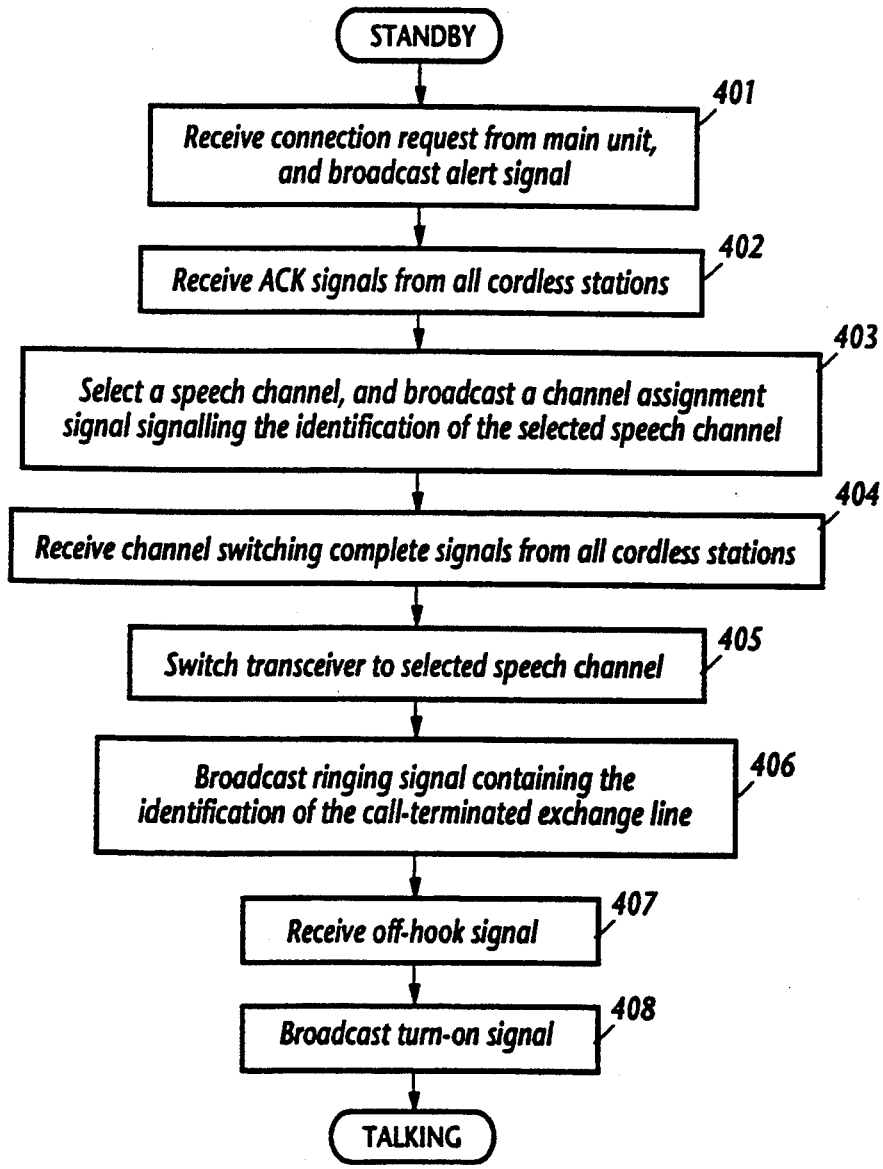
FIG. 4 is a flowchart showing instruction steps performed by the control unit of each access unit when an incoming call is terminated from the network.

The control unit 23 of each access unit is programmed to perform instruction steps shown in FIG. 4 when the access unit is selected in response to an incoming call. When the selected access unit receives a connection request from the main unit, it broadcasts an alert signal (step 401) on the control channel to all idle cordless stations, and receives acknowledgement (ACK) signals from such cordless stations (step 402), signalling receipt of the alert signal. The access unit then selects a speech channel and broadcasts a channel assignment signal to urge the cordless stations to switch their transceiver 31 to the selected speech channel (step 403). The cordless stations will then return a channel switching complete signal. On receiving it from each cordless station (step 404), the access unit switches its transceiver 22 to the selected speech channel (step 405), and broadcasts a ringing signal containing the identification of the exchange line to which the incoming call is terminated (step 406). When one of the alerted cordless stations answers the call, it sends an off-hook signal. On receiving it (step 407), the access unit broadcasts a turn-on signal (step 408) to cause the answering station to activate its coupling circuit 32 to establish a path between its transceiver and speech circuit.

The control unit 34 of each cordless station is programmed to perform an incoming-call process routine shown in FIG. 5A in response to an incoming call from the network. The routine starts with step 501 to receive an alert signal on a control channel from an access unit and proceeds to step 502 to return an ACK signal. Exit then is to step 503 to receive a channel assignment signal and switch over to a speech channel and returns a channel switching complete signal (steps 504, 505). A ringing signal will then be transmitted from the access unit and received by the cordless station (step 506). Control proceeds to step 507 to read the contents of tenant memory 37 of FIG. 2A or memory portion 37B of FIG. 2B, and determines whether a bit 1 is stored in the position of the memory that corresponds to the exchange line to which the incoming call is terminated (step 508). If the answer is affirmative, control determines that the cordless station is authorized to receive the incoming call and it branches at step 508 to step 509 to visually indicate the exchange line on line indicator 36 and generate a ringing tone to alert the user. If it goes off hook (step 510), control branches to a talking mode by returning an off-hook signal; otherwise it branches out to a standby mode by switching the transceiver to the control channel. If the cordless station is not authorized to answer the incoming call, control determines that a bit 0 is stored in the corresponding position of the tenant memory and control branches at step 508 to the standby mode.

If a call is originated from a cordless station, control unit 34 performs an originating-call routine shown in FIG. 5B which begins with step 521 to determine whether the cordless station goes off hook during standby mode, while depressing an exchange-line key on keypad 35. Exit then is to step 522 to read the line number of the depressed key and control goes to step 523 to read the contents of tenant memory 37 of FIG. 2A or memory portion 37A of Fig, 2B and determine whether a bit 1 is stored in the corresponding key position of the memory (step 524). If the answer is negative, the cordless station returns to the standby mode, and if affirmative, it branches at step 524 to step 525 to send a connection request on a control channel to an access unit which has been selected by the main unit to monitor the control channel. Control advances to step 526 to switch its transceiver to a speech channel specified by the access unit in a well known manner.

Figure 7:
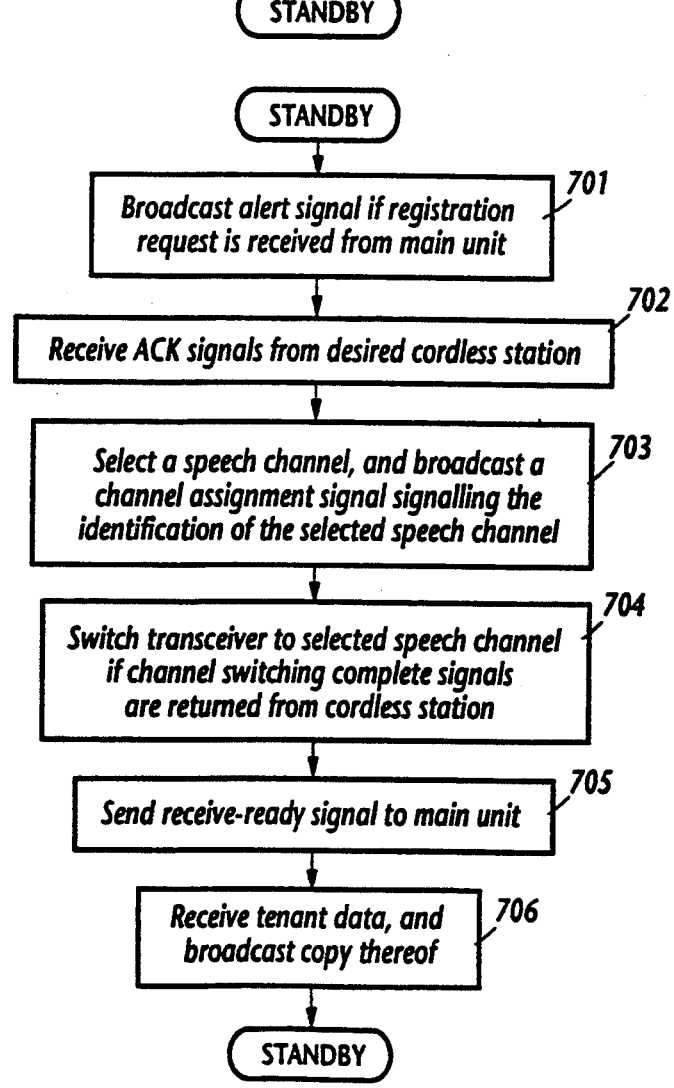
Figure 8:
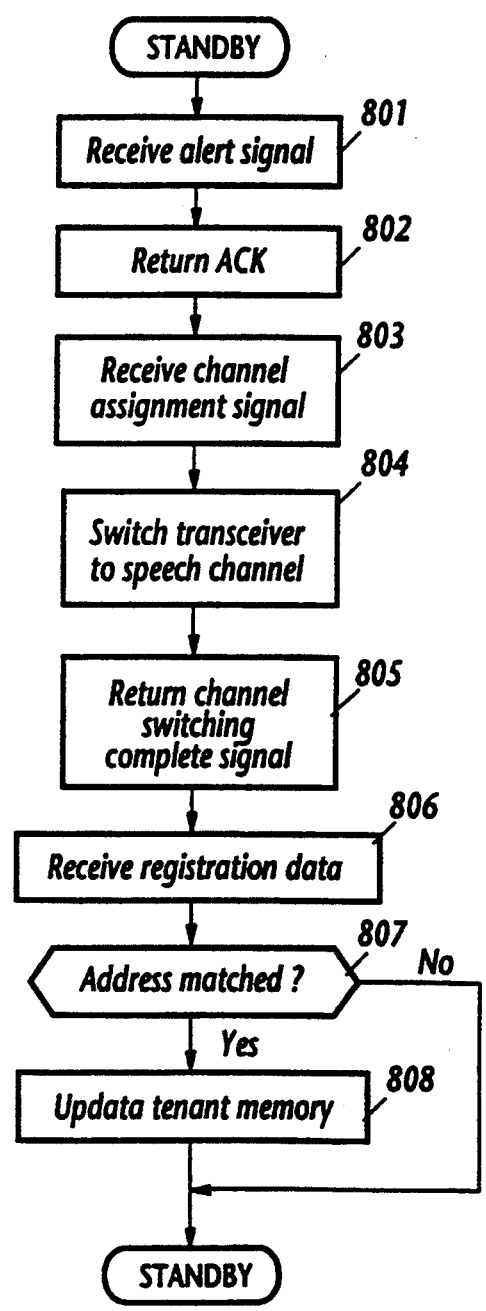
FIG. 8 Is a flowchart showing instruction steps performed by the control unit of each cordless station during the registration mode.

Tenant data are registered into every cordless station by entering command data into data input device 4. To permit the input device to make registration of tenant data, the control units of the main unit, access units and cordless stations are further programmed as shown in FIGS. 6, 7 and 8, respectively.

Figure 6:
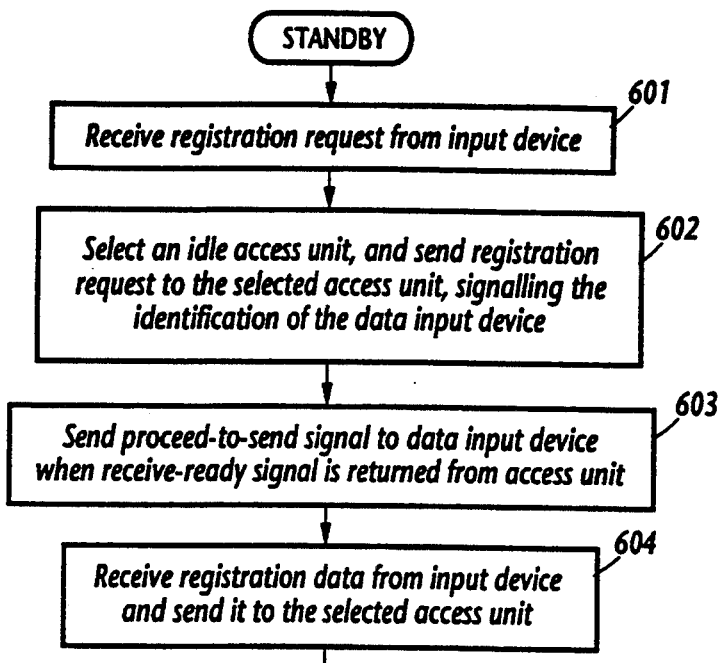
FIGS. 6 and 7 are flowcharts showing instruction steps performed by the control units of the main unit and each access unit, respectively, when tenant data is registered.

As shown in FIG. 6, the main unit begins execution at step 601 to receive a registration request from data input device 4 via interface 15 and selects an idle access unit and sends a copy of this request to the selected access unit (step 602), signalling the identification of the data input device. Exit then is to step 603 to send a proceed-to-send signal to data input device 4 when a receive-ready signal is returned from the access unit. Tenant data is then received from the input device and sent to the access unit (step 604). The tenant data comprises the identifier (address) of a desired cordless station followed by bit position data and a bit 1 or 0.

When the access unit receives the registration request from the main unit (step 701, FIG. 7), it broadcasts an alert signal on a control channel and receives an ACK signal from the desired cordless station (step 702). Exit then is to step 703 to select a speech channel and broadcast a channel assignment signal signalling the identification of the selected channel. Control advances to step 704 to switch the transceiver of the access unit to the selected speech channel when it receives a channel switching complete signals from the cordless station, and advances to step 705 to send back a receive-ready signal to the main unit. When the access unit receives tenant data from the data input device via the main unit, it broadcasts a copy of the data on the speech channel to the cordless station.

In each cordless station, the registration routine begins with step 801 to receive alert signal from a selected access unit, returns ACK signal (step 802) and receives a channel assignment signal to switch its transceiver to a selected speech channel (steps 803, 804). Following the transmission of a channel switching complete signal to the access unit (step 805), each cordless station receives registration tenant data (step 806) and checks the cordless station identifer contained therein with the address of the station to detect a match. If the address does not match the transmitted identifier, control terminates the routine and enters a standby state. If an address match occurs, control branches at step 807 to step 808 to update the tenant memory 37 with the registration data just received.

What is claimed is:

1. A cordless key telephone system comprising:
    connection setup means for establishing radio-frequency connections between each of a plurality of exchange lines and a plurality of cordless stations in response to an incoming call terminating at one of said exchange lines and in response to an originating call from one of said cordless stations and transmitting a ringing signal containing line identification of the line at which said incoming call is terminated,
    each of said cordless stations comprising:
        a plurality of line keys associated respectively with said exchange lines and a plurality of line indicators associated respectively with said line keys;
        a memory for storing tenant data indicating ones of said exchange lines to which the cordless station is authorized to access; and
        control means for examining said tenant data in response to receipt of the ringing signal through a said connection, and activating one of said line indicators when the exchange line indicated by the line identification contained in the ringing signal is found in the tenant data, and examining said tenant data in response to an outgoing call originated by the cordless station operating one of said line keys, and allowing said connection setup means to establish a said connection to one of said exchange lines when the exchange line associated with the operated line key is found in the tenant data.

2. A cordless key telephone system as claimed in claim 1, further comprising:
    data input means for transmitting a connection request to said connection setup means to cause connections to be established from said data input means to said cordless stations and transmitting through said connections tenant data containing station identification of a desired cordless station and relationships between ones of the exchange lines to which the cordless station is authorized to access,
    the control means of each of said cordless stations including means for determining whether the station identification contained in said tenant data matches identification of the cordless station, and storing said tenant data into said memory if there is a match between both of said identifications.

3. A cordless key telephone system comprising:
    connection setup means for establishing radio-frequency connections between each of a plurality of exchange lines and a plurality of cordless stations in response to an incoming call termination at one of said exchange lines and in response to an originating call from one of said cordless stations and transmitting a ringing signal containing line identification of the line at which said incoming call is terminated,
    each of said cordless stations comprising:
        a plurality of line keys associated respectively with said exchange lines and a plurality of line indicators associated respectively with said line keys;
        a memory for storing tenant data indicating ones of said exchange lines to which the cordless station is authorized to access; and
        control means for examining said tenant data in response to receipt of the ringing signal through a said connection, and activating one of said line indicators when the exchange line indicated by the line identification contained in the ringing signal is found in tenant data, and examining said tenant data from said memory in response to an outgoing call originated by the cordless station operating one of said line keys, and allowing said connection setup means to establish a said connection to one of said exchange lines when the exchange line associated with the operated line key is found in the tenant data, wherein the memory of each of said cordless stations comprises a first memory portion for storing tenant data indicating first ones of said exchange lines to which the cordless station is authorized to access when an incoming call is terminated and a second memory portion for storing tenant data indicating second ones of said exchange lines to which the cordless station is authorized to access when an outgoing call is originated from the cordless station, the control means of the cordless station examining the tenant data from said first memory portion in response to receipt of the ringing signal through a said connection and activating one of said line indicators when the exchange line indicated by the line identification contained in the ringing signal is found in the tenant data stored in the first memory portion, and examining the tenant data from said second memory portion in response to an outgoing call originated by the cordless station operating one of said line keys and allowing said connection setup means to establish a said connection to the exchange line associated with the operated line key when the exchange line associated with the operated line key is found in the tenant data stored in the second memory portion.

4. A cordless key telephone system as claimed in claim 3, further comprising:

data input means for transmitting a connection request to said connection setup means to cause connections to be established from said data input means to said cordless stations and transmitting through said connections tenant data containing station identification of a desired cordless station and relationships between ones of the exchange lines to which the cordless station is authorized to access, the control means of each of said cordless stations including means for determining whether the station identification contained in said tenant data matches identification of the cordless station, and storing said tenant data into said memory if there is a match between both of said identifications.

5. A cordless key telephone system comprising:

a main unit having first terminals coupled to a switched telephone network via a plurality of exchange lines and second terminals for establishing a first, switched path between said first and second terminals, said main unit including means for generating a ringing signal containing line identification of an exchange line to which an incoming call is terminated from said network; and a plurality of access units connected to the second terminals of said main unit for establishing second, radio-frequency paths to the cordless stations, whereby connections are established between one of said exchange lines and said cordless stations through said first and second paths;

each of said cordless stations comprising:

a plurality of line keys associated respectively with said exchange lines and a plurality of line indicators associated respectively with said line keys;

a memory for storing tenant data indicating ones of said exchange lines to which the cordless station is authorized to access; and control means for examining said tenant data in response to receipt of the ringing signal through a said connection, and activating one of said line indicators when the exchange line indicated by the line identification contained in the ringing signal is found in the tenant data, and examining said tenant data in response to an outgoing call originated by the cordless station operating one of said line keys, and allowing one of said access units and said main unit to establish a said connection to one of said exchange lines when the exchange line associated with the operated line key is found in the tenant data.

6. A cordless key telephone system as claimed in claim 5, further comprising:

data input means for transmitting a connection request to the main unit to cause said main unit and one of said access units to establish connections from said data input means to said cordless stations and transmitting through said connections tenant data containing station identification of a desired cordless station and ones of said exchange lines to which the cordless station is authorized to access, the control means of each of said cordless stations including means for determining whether the station identification contained in said tenant data matches identification of the cordless station, and storing said tenant data into said memory if there is a match between both of said identifications.

7. A cordless key telephone system comprising:

a main unit having first terminals coupled to a switched telephone network via a plurality of exchange lines and second terminals for establishing a first, switched path between said first and second terminals, said main unit including means for generating a ringing signal containing line identification of an exchange line to which an incoming call is terminated from said network; and a plurality of access units connected to the second terminals of said main unit for establishing second, radio-frequency paths to the cordless stations, whereby connections are established between one of said exchange lines and said cordless station through said first and second paths;

each of said cordless stations comprising:

plurality of line keys associated respectively with said exchange lines and a plurality of line indicators associated respectively with said line keys;

a memory for storing tenant data indicating ones of said exchange lines to which the cordless station is authorized to access; and control means for examining said tenant data in response to receipt of the ringing signal through a said connection, and activating one of said line indicators when the exchange line indicated by the line identification contained in the ringing signal is found in the tenant data, and examining said tenant data from said memory in response to an outgoing call originated by the cordless station operating one of said line keys, and allowing one of said access units and said main unit to establish a said connection to one of said exchange lines when the exchange line associated with the operated line key is found in the tenant data, wherein the memory of each of said cordless stations comprises a first memory portion for storing tenant data indicating first ones of said exchange lines to which the cordless station is authorized to access when an incoming call is received from said network and a second memory portion for storing tenant data indicating second ones of said exchange lines to which the cordless station is authorized to access when an outgoing call is originated from the cordless station, the control means of the cordless station examining the tenant data from said first memory portion in response to receipt of the ringing signal through a said connection and activating one of said line indicators when the exchange line indicated by the line identification contained in the ringing signal is found in the tenant data stored in the first memory portion, and examining the tenant data from said second memory portion in response to an outgoing call originated by the cordless station operating one of said line keys and allowing one of said access units and said main unit to establish a said connection to the exchange line associated with the operated line key when the exchange line associated with the operated line key is found in the tenant data stored in the second memory portion.

8. A cordless key telephone system as claimed in claim 7, further comprising:

data input means for transmitting a connection request to the main unit to cause said main unit and one of said access units to establish connections from said data input means to said cordless stations and transmitting through said connections tenant data containing station identification of a desired cordless station and ones of said exchange lines to which the cordless station is authorized to access, the control means of each of said cordless stations including means for determining whether the station identification contained in said tenant data matches identification of the cordless station, and storing said tenant data into said memory if there is a match between both of said identifications.

* * * * *